US009316078B2

(12) United States Patent
Ludtka et al.

(10) Patent No.: US 9,316,078 B2
(45) Date of Patent: Apr. 19, 2016

(54) INDUCTIVE SHEARING OF DRILLING PIPE

(71) Applicant: Transocean Sedco Forex Ventures Limited, George Town Grand Cayman (KY)

(72) Inventors: Gerard M. Ludtka, Oak Ridge, TN (US); John Wilgen, Oak Ridge, TN (US); Roger Kisner, Farragut, TN (US); Timothy Mcintyre, Farragut, TN (US)

(73) Assignee: TRANSOCEAN INNOVATION LABS LTD, George Town (KY)

( * ) Notice: Subject to any disclaimer, the term of this patent is extended or adjusted under 35 U.S.C. 154(b) by 305 days.

(21) Appl. No.: 13/844,057

(22) Filed: Mar. 15, 2013

(65) Prior Publication Data
US 2014/0110116 A1   Apr. 24, 2014

Related U.S. Application Data

(60) Provisional application No. 61/717,480, filed on Oct. 23, 2012.

(51) Int. Cl.
*E21B 29/02* (2006.01)
*E21B 43/11* (2006.01)
*E21B 29/08* (2006.01)
*E21B 33/064* (2006.01)

(52) U.S. Cl.
CPC .............. *E21B 29/02* (2013.01); *E21B 29/08* (2013.01); *E21B 33/064* (2013.01); *E21B 43/11* (2013.01)

(58) Field of Classification Search
CPC ....... E21B 29/02; E21B 33/063; E21B 29/08; E21B 33/064
USPC .......................................................... 148/520
See application file for complete search history.

(56) References Cited

U.S. PATENT DOCUMENTS

| 4,646,825 | A | 3/1987 | Van Winkle ..................... 166/55 |
|---|---|---|---|
| 5,224,638 | A * | 7/1993 | Nolan et al. ...................... 225/2 |
| 6,730,893 | B1 * | 5/2004 | Runde ............................ 219/635 |
| 2002/0141797 | A1 * | 10/2002 | Hirst et al. ..................... 399/333 |
| 2006/0231549 | A1 * | 10/2006 | Kisner et al. ................... 219/635 |
| 2007/0170722 | A1 * | 7/2007 | Reynolds et al. .............. 285/334 |
| 2007/0267405 | A1 * | 11/2007 | Feigen-Blum et al. ....... 219/601 |
| 2008/0236809 | A1 * | 10/2008 | Livingstone .................... 166/60 |
| 2009/0118126 | A1 | 5/2009 | Burke et al. ................... 505/211 |
| 2009/0194290 | A1 | 8/2009 | Parks et al. |
| 2010/0244929 | A1 | 9/2010 | Jalbout et al. ................. 327/427 |
| 2012/0213639 | A1 | 8/2012 | Noble et al. .............. 416/223 R |

FOREIGN PATENT DOCUMENTS

| NO | 20110729 A1 * | 5/2012 | ............. E21B 33/06 |
|---|---|---|---|
| NO | 20110729 | 12/2012 | |
| WO | WO/2012/158044 | 11/2012 | |

OTHER PUBLICATIONS

International Search Report in International Application No. PCT/US2013/066179 dated Mar. 28, 2014.

* cited by examiner

*Primary Examiner* — Robert E Fuller
*Assistant Examiner* — Christopher Sebesta
(74) *Attorney, Agent, or Firm* — Norton Rose Fulbright US LLP

(57) ABSTRACT

Induction shearing may be used to cut a drillpipe at an undersea well. Electromagnetic rings may be built into a blow-out preventer (BOP) at the seafloor. The electromagnetic rings create a magnetic field through the drillpipe and may transfer sufficient energy to change the state of the metal drillpipe to shear the drillpipe. After shearing the drillpipe, the drillpipe may be sealed to prevent further leakage of well contents.

19 Claims, 8 Drawing Sheets

INDUCTIVE SHEARING OF DRILLING PIPE

CROSS-REFERENCE TO RELATED APPLICATIONS

This application claims benefit of priority to U.S. Provisional Patent Application No. 61/717,480 to Ludka et a. filed Oct. 23, 2012 and entitled "Inductive Shearing of Drilling Pipe," which is hereby incorporated by reference in its entirety.

The United States Government has rights in this invention pursuant to contract no. DE-AC05-00OR22725 between the United States Department of Energy and UT-Battelle, LLC. and Work for Others Agreement No. NFE-12-04104 between UT-Battelle, LLC. and Transocean Technology Innovations. LLC.

TECHNICAL FIELD

This disclosure relates to drilling equipment and, in particular, blow out preventers.

BACKGROUND

Blow-out preventers are devices placed on a subsea well to prevent a catastrophic blowout. In particular, blow-out preventers are designed as a last-line of defense to prevent leakage of contents of the well into the sea. Two component systems in a BOP to address this problem involve an annular BOP, which is a rubber device to close and completely shut off an empty or drill-in bore, and an actuated ram, which is designed to close an open hole or close around a fixed pipe size. Certain actuated rams may have the capability to shear the pipe, if necessary, for an emergency disconnect. Actuation of both of these devices involves hydraulic systems and moving components. Sealing the well is a preferred solution in a catastrophic blowout, but cutting or shearing of the drillpipe is performed for emergency disconnect situations.

Pipe shearing is an important activity for handling emergency conditions on drilling vessels and platforms. A BOP on the seafloor may include devices to perform pipe shearing when emergency situations arise that require fast action. Pipe shearing is conventionally carried out through mechanical means, such as pipe shearing rams. However, shear rams are limited by the thickness of the pipe they can cut. When an emergency arises and contents of the well are escaping through the drillpipe, immediate action is necessary to preserve human life and to preserve the environment.

SUMMARY

Induction shearing may be used to cut a drillpipe at an undersea well. Electromagnetic rings may be built into a blow-out preventer (BOP) at the seafloor. The electromagnetic rings create a magnetic field through the drillpipe and may transfer sufficient energy to change the state of the metal drillpipe to shear the drillpipe.

According to one embodiment, an apparatus includes a clamp adjustable to open and close around a pipe, wires embedded in the clamp to form coils, and a power supply coupled to the wires. The power supply may be configured to apply power to the wires to heat the pipe through induction to shear the pipe.

According to another embodiment, an apparatus includes an induction heating coil configured to close on a drillpipe and an induction power supply coupled to the induction heating coil.

According to a further embodiment, an apparatus includes means for inductively shearing a drillpipe, and a power supply coupled to the inductive shearing means.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF SUMMARY OF THE DRAWINGS

For a more complete understanding of the disclosed system and methods, reference is now made to the following descriptions taken in conjunction with the accompanying drawings.

DETAILED DESCRIPTION

Figure 1:
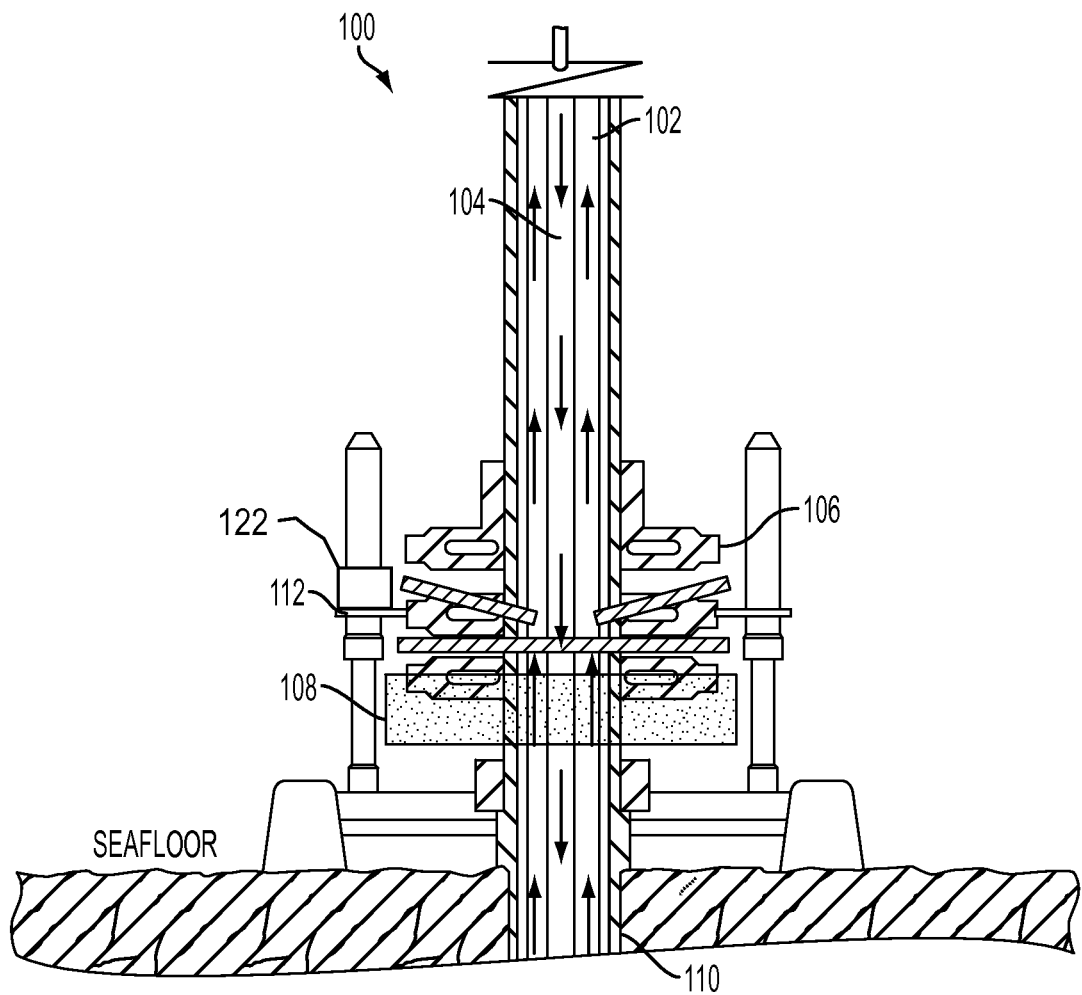
FIG. 1 is a schematic illustrating a blow-out preventer (BOP) design with inductive shearing according to one embodiment of the disclosure.

FIG. 1 is a schematic illustrating a blow-out preventer (BOP) design with inductive shearing according to one embodiment of the disclosure. A drilling system 100 may include a riser 102 surrounding a drillpipe 104. Drilling fluid (not shown) may be pumped down through the drillpipe 104. Drilling fluid and cuttings may return through a space between the drillpipe 104 and the riser 102. The system 100 may also include a blow-out preventer 106, an induction heating coil 112, and a pipe-grasp-and-hold device 108 attached near the seafloor. The riser 102 may be surrounding by a surface casing 110. A well (not shown) may be located beneath the seafloor, with the drillpipe 104 extending into the well.

In certain situations, it may be necessary to seal the riser 102 and the drillpipe 104. For example, if fluid pressures within the riser 102 exceed certain limits an emergency may arise causing the contents of the well to escape through the drillpipe 104 and/or the riser 102. In another example, the riser 102 and/or the drillpipe 104 may be sealed during repairs to equipment of the system 100.

Sealing of the drillpipe 104 and/or the riser 102 may be completed by pipe shearing. The drillpipe 104 and/or the riser 102 may be sheared through electromagnetic inductive shearing. In electromagnetic induction, electric current is passed through a conductor to generate an electromagnetic (EM) field. The electromagnetic field may be directed through the drillpipe 104 and/or the riser 102, and the drillpipe 104 and/or the riser 102 may conduct energy from the electromagnetic field. Thus, power is transferred from the conductor to the drillpipe 104 and/or the riser 102 without physical contact between the conductor and the drillpipe 104 and/or the riser 102. As the drillpipe 104 and/or the riser 102 receives energy from the electromagnetic field, a temperature of the drillpipe 104 and/or the riser 102 may rise. When a portion of the drillpipe 104 and/or the riser 102 reach a melting point, that portion of the drillpipe 104 and/or the riser 102 changes state to liquid resulting in shearing of the drillpipe 104 and/or the riser 102.

One advantage of inductive shearing of the drillpipe 104 and/or the riser 102 is a reduced number of moving parts. By reducing the number of moving mechanical parts during shearing, the shearing may be accomplished in reduced time. In certain embodiments, the shearing time may be as small as a few second. Further, inductive shearing of the drillpipe 104 and/or the riser 102 results in a clean, narrow circumferential cut.

Figure 2:
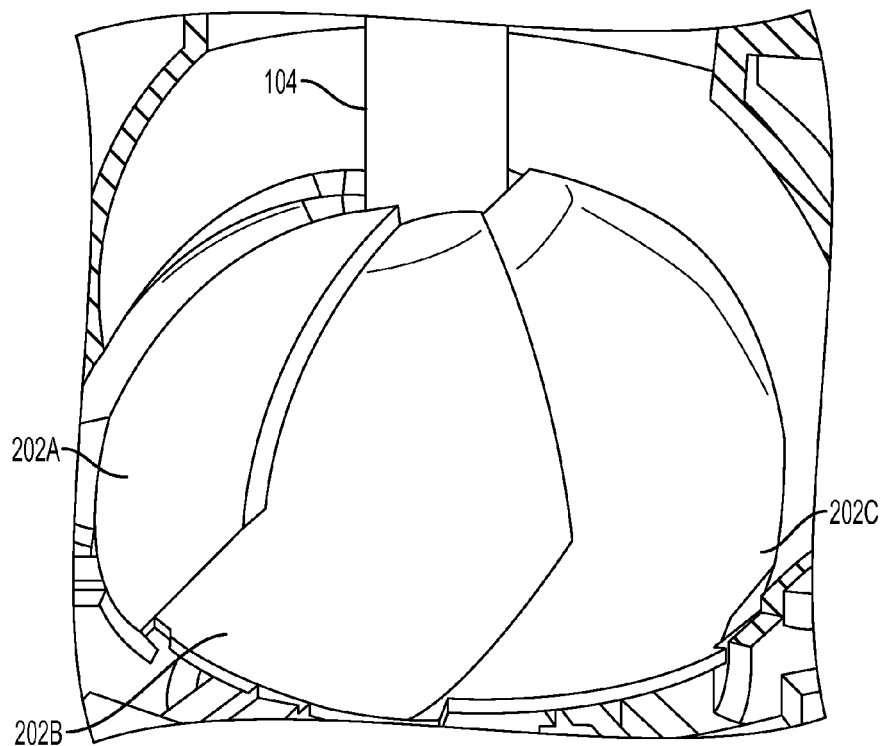
FIG. 2 is a perspective view of a gripping ring having two or more overlapping blades engageable on a drilling pipe through a rotating mechanism according to one embodiment of the disclosure.

The induction heating coil 112 may be configured as a set of overlapping blades that may open and close around the drillpipe 104 and/or the riser 102. FIG. 2 is a perspective view of a gripping ring having two or more overlapping blades engageable on a drillpipe through a rotating mechanism according to one embodiment of the disclosure. Blades 202A, 202B, and 202C may overlap in a manner that allow the blades 202A-C to expand and contract around the drillpipe 104. The expansion and contraction of the blades 202A-C may be accomplished with a rotating mechanism (not shown) attached to the blades 202A-C. When the rotating mechanism turns in one direction, the overlapping blades 202A-C may close on the drillpipe 104. When the rotating mechanism turns in the other direction, the overlapping blades 202A-C may open away from the drillpipe 104. In such a configuration, the overlapping blades close around the drill pipe to create an electromagnetic field extending through the drilling pipe to a conductor in a second blade.

Figure 3:
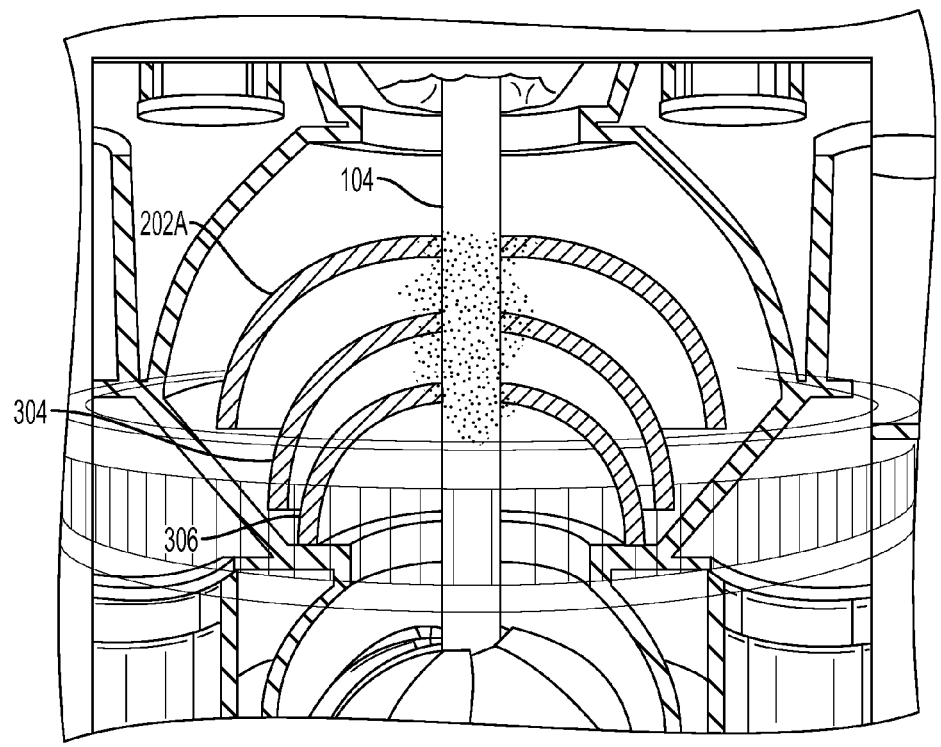
FIG. 3 is a cross-sectional view of shear rings with embedded wires for induction shearing of drilling pipe according to one embodiment of the disclosure.

The blades 202A-C may function as a conductor for electricity to produce a magnetic field around the drillpipe 104 to shear the drillpipe 104. Additional rings of blades may contained within the volume defined by the blades 202A-C. FIG. 3 is a cross-sectional view of shear rings with embedded wires for induction shearing of drilling pipe according to one embodiment of the disclosure. A second and third set of blades 304 and 306, respectively, may overlap in a similar manner to the blades 202A-C. The blades 304 and 306 may provide additional current and magnetic field at the drillpipe 104 for shearing the drillpipe 104. The blades 304 and 306 may also provide current and magnetic field at different locations along the drillpipe 104 to allow an operator to decide a location on the drillpipe 104 to shear the drillpipe 104.

The conductor for creating the electromagnetic field may be the blades 202A-C. For example, the wires may form coils by extending from one side of the blade to an opposite side of the blade. The conductor may also be wires (not shown) embedded in blades 202A-C. The blades 202A-C may have wires embedded near a surface of the blades 202A-C nearest the drillpipe 104. The conductor, when the blades 202A-C are closed around the drillpipe 104 for inductive shearing, may be less than 5 cm from the drillpipe 104. An insulating material, such as plexiglass, may be used at the end of a clamp between the blades 202A-C and the drillpipe 104 to prevent excessive thermal heating of the conductor.

The number of turns in the coils to create the electromagnetic field may be varied, along with the voltage applied to the coils, to vary the amount of power inductively transferred from a power supply to the pipe. According to one embodiment, the number of turns may be between three and five turns, and the total power transferred may be between 10 kiloWatts and 500 kiloWatts.

In one embodiment, the shear ring may also work cooperatively with a gripping ring (not shown). A gripping ring may include one or more overlapping blades attached to a rotating mechanism.

According to one embodiment, during the electromagnetic induction, the drilling pipe may be placed under mechanical tension. Mechanisms may be built into the blow-out preventer (BOP) or another module attached underwater to the drilling pipe to apply tension to the drilling pipe. Alternatively, the drilling vessel or drilling platform attached to the drilling pipe may apply tension.

Figure 4:
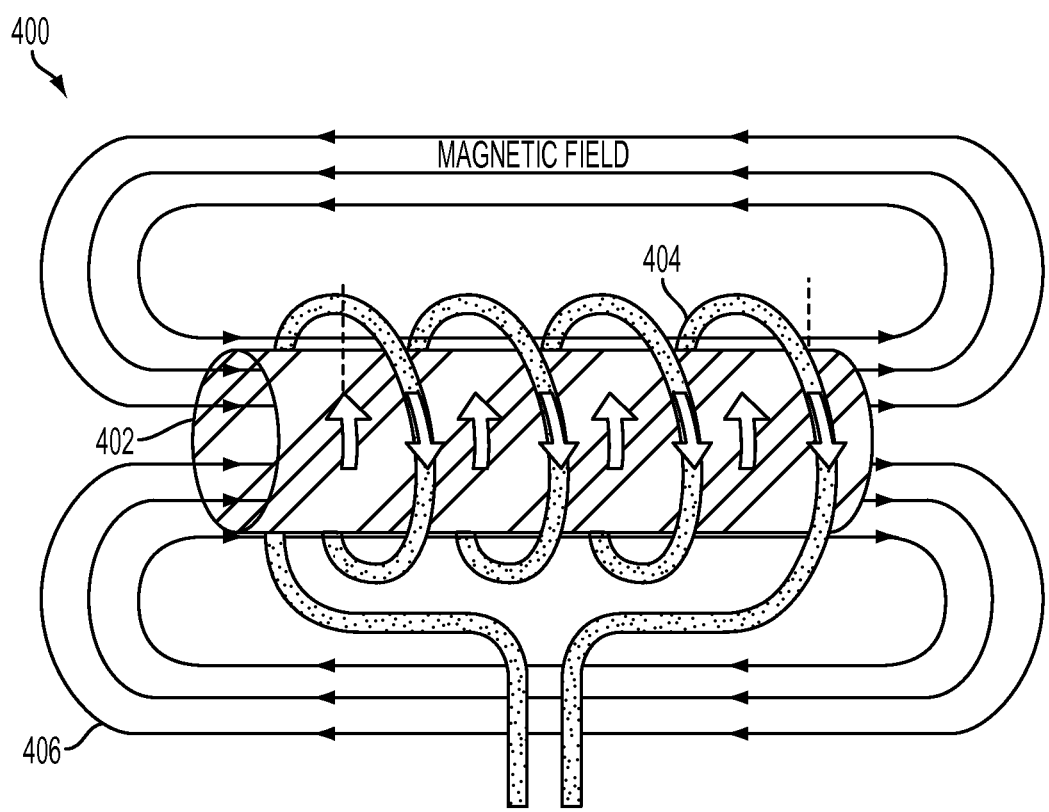
FIG. 4 is a schematic illustration operation of inductive shearing according to one embodiment of the disclosure.

FIG. 4 is a schematic illustration operation of inductive shearing according to one embodiment of the disclosure. Induction comprises heating by sending an alternating current (AC) electrical current through an inductor coil 404, such as a water-cooled copper helical coil, which generates a magnetic field 406 circulating in and/or around the coil 404. When an electrically conducting material 402, such as a drillpipe, is placed inside the coil 404, the magnetic field 406 may enters the material 402 and generate induced eddy currents. The eddy currents, because of the resistance of the material, result in Joule heating. When the material 402 includes magnetic materials, the material 402 may offer resistance to rapidly changing magnetic fields 406 in the inductor 404. For example, a steel drillpipe may offer resistance to the magnetic fields 406 to enhance induction of the magnetic fields 406.

Inductive shearing as described in FIG. 4 may be applied to shearing a drillpipe. Induction heating may provide a method for cutting drillpipes, such as in an emergency situation, but also may be able to reform the drillpipe. For example, inductive rings may heat the drillpipe, such as below a cut region into a high temperature austenite phase of steel (around 850° C.) where a yield strength of the steel drops, for example to several ksi, where alternate means, such as either a large magnetic pulse or simple mechanical means, may crimp and seal the drillpipe. According to one embodiment, the crimping and sealing may be through electromagnetic pulse forming.

Figure 5:
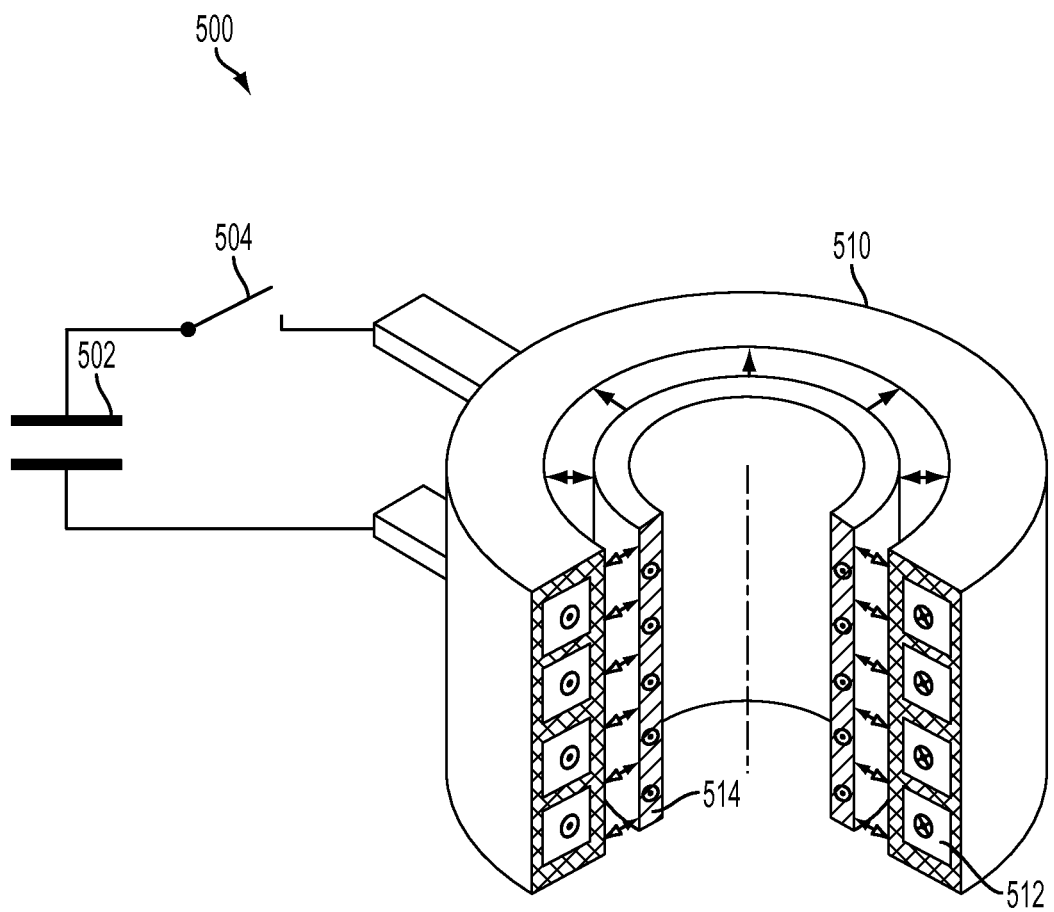
FIG. 5 is a cross-section illustrating electromagnetic shearing of a drillpipe according to one embodiment of the disclosure.

FIG. 5 is a cross-section illustrating electromagnetic shearing of a drillpipe according to one embodiment of the disclosure. A drillpipe 514 may be placed inside an electromagnetic coil 510 with supporting coil casing. Compression, and later shearing, of a drillpipe 514 may occur when a switch 504 controlling a power supply 502, such as a capacitor bank, is opened and a rapidly changing magnetic field is discharged through coils 512. Then, current may be induced in the drillpipe 514. An opposing magnetic field is induced by the drillpipe 514 may repel the drillpipe 514 from the coils 512 causing the drillpipe 514 to deform inwardly. After a certain duration of time, the deformation of the drillpipe 514 shears the drillpipe 514. Pressures up to and exceeding 50 kilopounds per square inch (ksi) may be generated with velocities up to 900 feet per second (fps). In one embodiment, a second induction coil (not shown) may heat a local region of the drillpipe 514 into the high temperature steel phase with strength of only 2 to 3 ksi, causing the drillpipe 514 inward on itself to seal the drillpipe 514.

Figure 6:
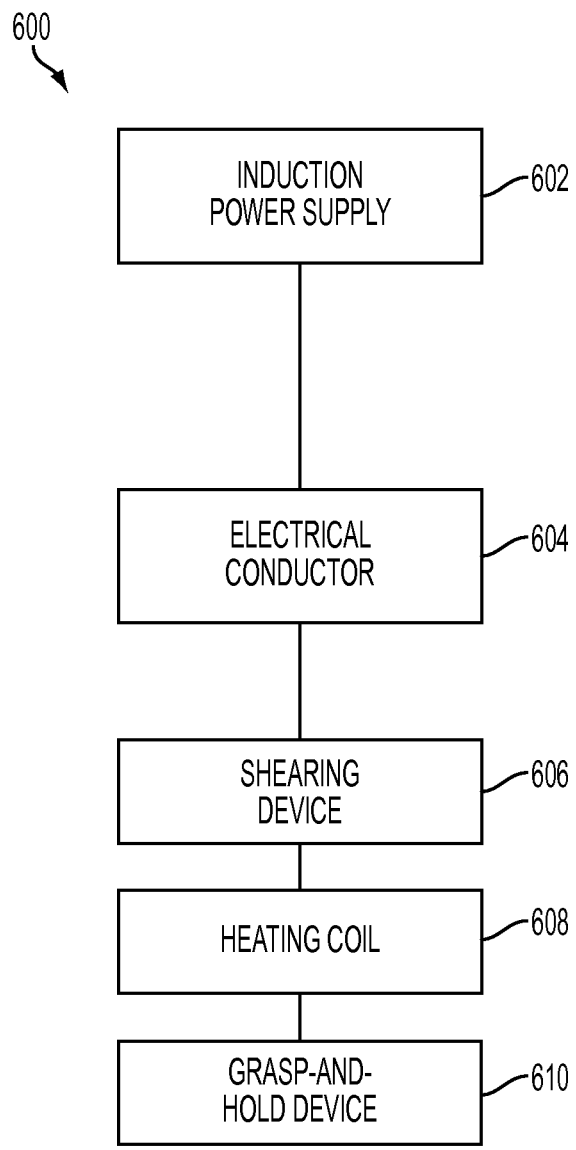
FIG. 6 is a block diagram illustrating implementation of a blow-out preventer with induction heating coils according to one embodiment of the disclosure.

FIG. 6 is a block diagram illustrating implementation of a blow-out preventer with induction heating coils according to one embodiment of the disclosure. A drilling system 600 may include an induction heating coil 608. The coil 608 may be connected electrically through a special conductor to an induction power supply 602, which may be located on a drill ship. The coil 602 may include a storage system in the subsea system to protect it until the coil 602 is used. Although described on a drill ship, the power supply 602 may also be located subsea at the BOP. The coil may be actuated from a storage location to a heating location to heat the drillpipe, such as shown in FIGS. 2-3.

The system 600 may also include an electrical conductor 604 from the drill ship to the subsea system. The conductor 604 may supply power from the supply 602 to the heating coil 608. The power may be provided, for example, as high-frequency high-current electricity from the induction power supply 602 or three-phase 480 VAC electricity to a subsea induction power supply near the heating coil 608. The conductor 604 may be water cooled and separation and shielding to avoid incidental RF heating. The system 600 may further include a drillpipe grasp-and-hold device 610, which secures the drillpipe string after shearing and separation. The system 600 may also include a shearing device 606. The heating coil 608 may be used to heat the drillpipe to facilitate weakening by degrading the steel properties of the drillpipe.

Figure 7:
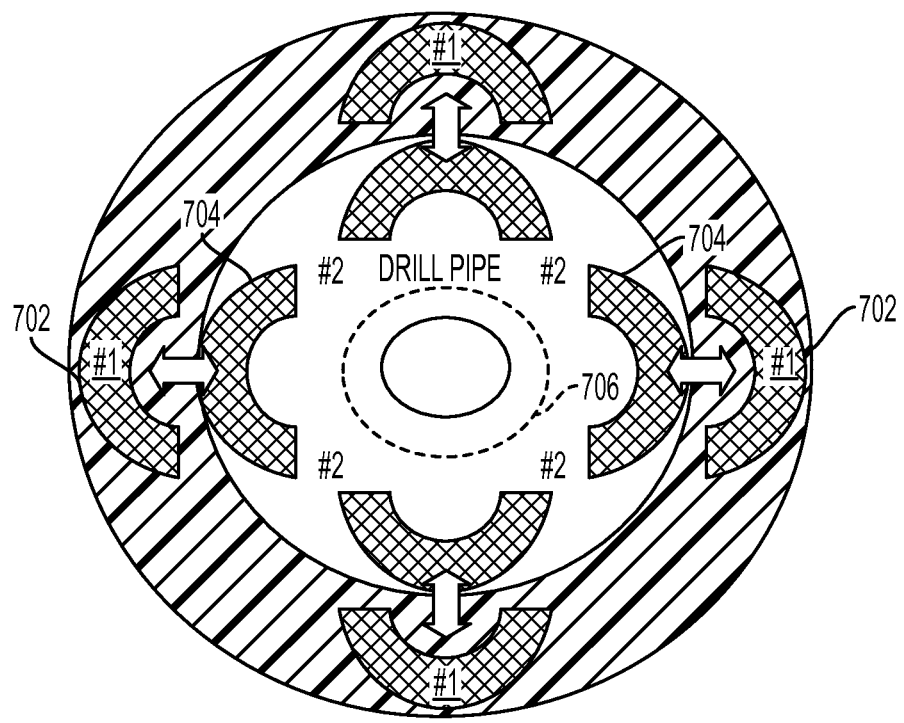
FIG. 7 is a top-down view illustrating induction coil actuation according to one embodiment of the disclosure.

FIG. 7 is a top-down view illustrating induction coil actuation according to one embodiment of the disclosure. The induction coil may begin in a first position 702, such as when stored or not in use. When commanded to engage a drillpipe 706, the induction coil may move to a second position 704. At position 704, current may be applied to the induction coils to begin shearing of the drillpipe 706.

Figure 8:
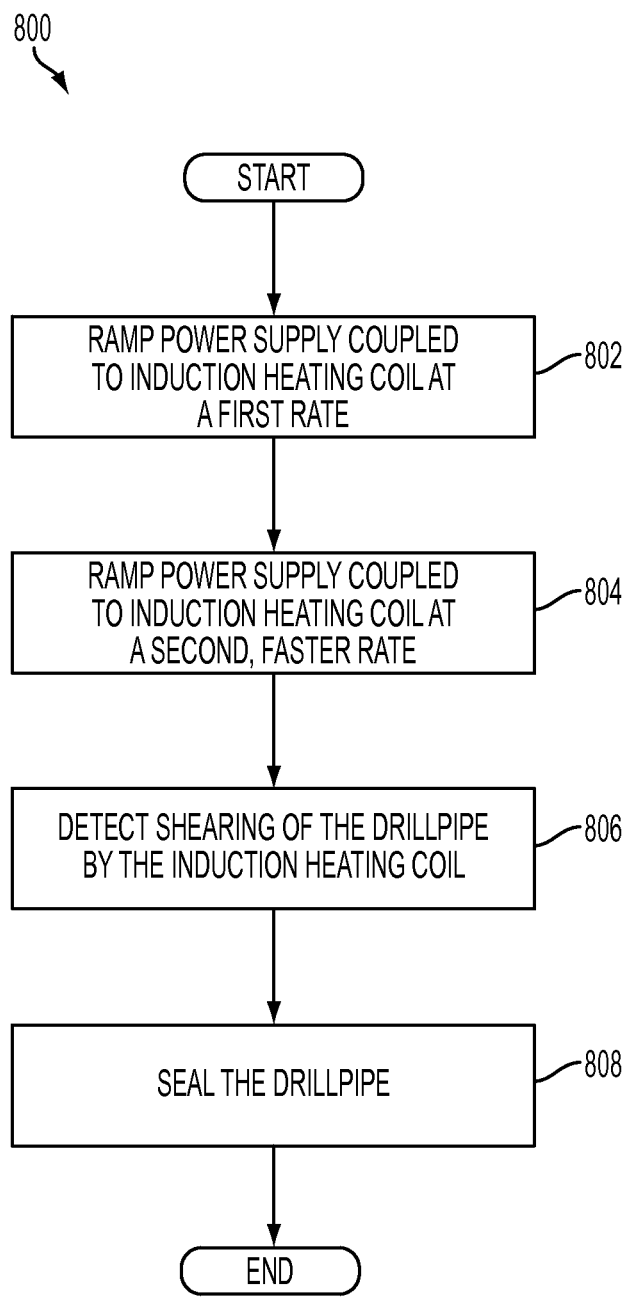
FIG. 8 is a flow chart illustrating a method of inductively cutting drilling pipe according to one embodiment of the disclosure.

FIG. 8 is a flow chart illustrating a method of inductively cutting drilling pipe according to one embodiment of the disclosure. One procedure for applying power to the coils from the power supply when inductive shearing of the drilling pipe is requested is to ramp up the power from the power supply. Ramping up the power supply, rather than activating at full power, may reduce problems with activating pipe shearing at high power levels. At block 802, a power supply coupled to the induction heating coil may be ramped at a first rate to a first temperature of the drillpipe. For example, one procedure may include ramping the power supply at a first linear rate from zero until the temperature of the drilling pipe reaches 700 degrees Celsius. Then, at block 804, the power supply may be ramped at a second, faster rate to a target temperature, such as a temperature to shear the drillpipe. The procedure to ramp from zero power to reaching a power level to shear the drilling pipe may take less than thirty seconds, or in certain embodiments, less than five seconds. The power supply for the electromagnetic induction may be a battery underwater and attached to the module. The operation of the power supply and application of electromagnetic induction may be executed by a controller. The method of FIG. 8 may be programmed in a controller coupled to the BOP for controlling the induction coils and shearing of the drillpipe.

Figure 9:
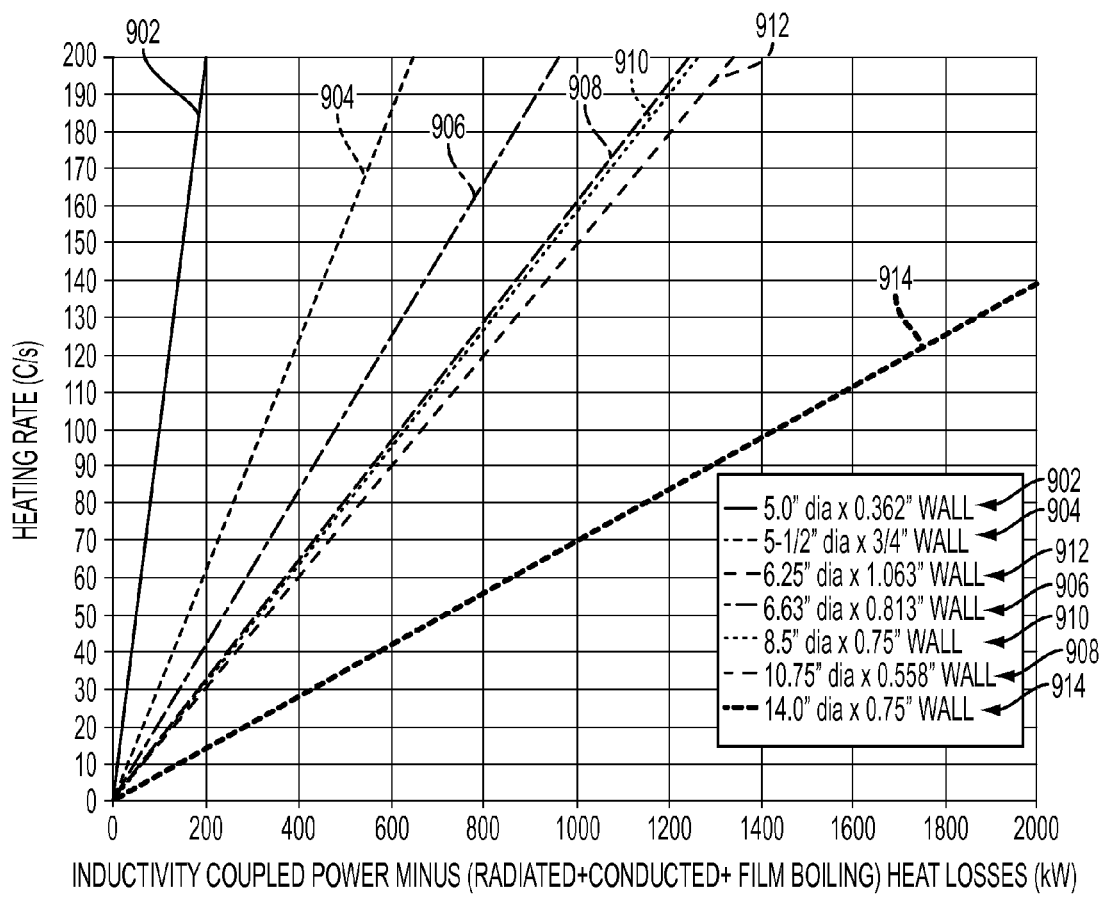
FIG. 9 is a graph illustrating heating rate of various pipe diameters according to one embodiment of the disclosure.

FIG. 9 is a graph illustrating heating rate of various pipe diameters according to one embodiment of the disclosure. The graph of FIG. 9 includes lines 902, 904, 906, 908, 910, 912, and 914 illustrate heating rates at various power levels for pipes with 5" diameter and 0.362" thick wall, 5.5" diameter and 0.75" wall, 6.63" diameter and 0.813" wall, 10.75" diameter and 0.558" thick wall, 8.5" diameter and 0.75" wall, 6.25" diameter and 1.063" wall, and 14.0" diameter and 0.75" wall, respectively.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An apparatus, comprising:
 a plurality of conductive segments configured to be disposed around a drillpipe, each moveable relative to the drillpipe between a stored position and a closed position in which the conductive segment is radially closer to the drillpipe, the plurality of conductive segments, when each is in the closed position but not when each is in the store position, cooperating to define an induction heating coil around the drillpipe; and
 an induction power supply configured to supply power to the induction heating coil to shear the drillpipe.

2. The apparatus of claim 1, further comprising a grasp-and-hold device configured to couple to the drillpipe.

3. The apparatus of claim 1, wherein each conductive segment comprises a blade configured to partially overlap with the blade of an adjacent conductive segment.

4. The apparatus of claim 3, further comprising a second plurality of conductive segments configured to be disposed around the drillpipe, each movable relative to the drillpipe between a stored position and a closed position in which the conductive segment is radially closer to the drillpipe, the plurality of conductive segments, when each is in the closed position but not when each is in the stored position, cooperating to define a second induction heating coil around the drillpipe.

5. The apparatus of claim 1, further comprising a controller configured to couple to the induction power supply and to direct power from the induction power supply to the induction heating coil.

6. The apparatus of claim 5, in which the controller is configured to:
 ramp the induction power supply to a first power level at a first linear rate; and
 ramp the induction power supply to a second power level at a second linear rate.

7. The apparatus of claim 1, further comprising a tension mechanism configured to couple to the drillpipe and when coupled, to apply tension to the drillpipe when the induction heating coil heats the drillpipe.

8. The apparatus of claim 1, further comprising a sealing mechanism configured to couple and seal the drillpipe after cutting the drillpipe with the induction heating coil.

9. The apparatus of claim 1, further comprising a water-cooled conductor configured to couple the induction power supply to the induction heating coil.

10. An apparatus, comprising:
a clamp comprising a plurality of clamp members configured to close around a pipe, each movable relative to the pipe between an open position and a closed position in which the clamp member is radially closer to the pipe and each comprising a conductive segment,
where, when each of the plurality of clamp members is in the close position, the conductive segments cooperate to define one or more coils around the pipes; and
where the one or more coils are configured to couple to a power supply configured to apply power to the one or more coils to heat the pipe through induction to shear the pipe.

11. The apparatus of claim 10, wherein each clamp member comprises a blade configured to partially overlap with the blade of an adjacent clamp member.

12. The apparatus of claim 10, further comprising a controller configured to couple to the power supply and to:
ramp the power supply to a first power level at a first linear rate; and
ramp the power supply to a second power level at a second linear rate.

13. The apparatus of claim 10, in which the power supply is configured to be located near the clamp.

14. An apparatus, comprising:
shearing means comprising conductive segments being movable relative to the drillpipe between an open position and a closed position in which the conductive segments are radially closer to the drillpipe and configured for inductively shearing a drillpipe; and
a power supply configured to supply power to the conductive segments.

15. The apparatus of claim 14, further comprising means for controlling application of power from the power supply to the inductive shearing means.

16. The apparatus of claim 14, further comprising a means for sealing the drillpipe after shearing the drill pipe with the inductive shearing means.

17. The apparatus of claim 14, in which the apparatus is a blow-out preventer (BOP).

18. The apparatus of claim 10, wherein each clamp member comprises a blade.

19. The apparatus of claim 14, wherein the inductive shearing means comprises a plurality of blades, each movable relative to the drillpipe between an open position and a closed position in which each blade is radially closer to the drillpipe.

* * * * *